Sept. 4, 1928.
H. P. KRAFT
PRESSURE GAUGE
Original Filed March 25, 1921
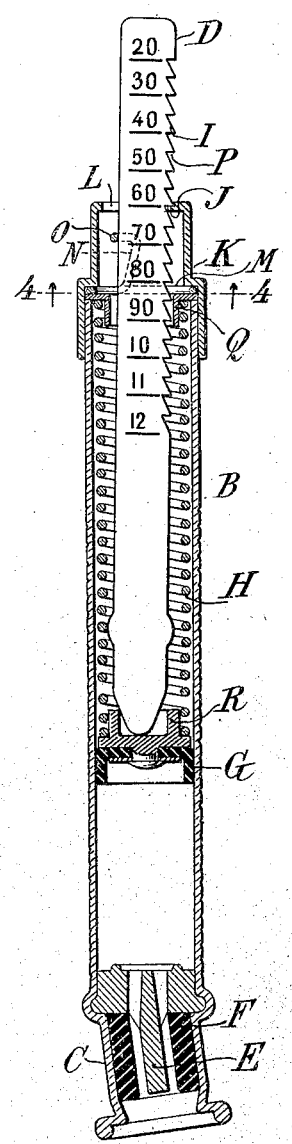
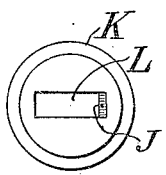
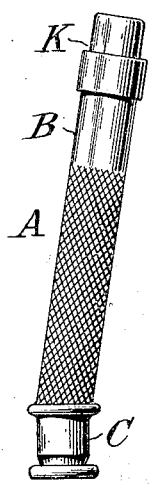
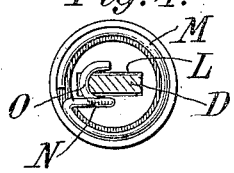
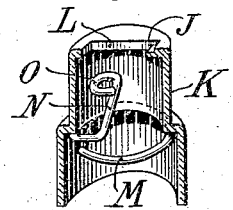
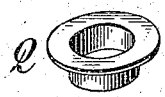

Patented Sept. 4, 1928.

1,683,471

UNITED STATES PATENT OFFICE.

HENRY P. KRAFT, OF RIDGEWOOD, NEW JERSEY; EDGAR J. PHILLIPS AND EARL A. DARR EXECUTORS OF HENRY P. KRAFT, DECEASED.

PRESSURE GAUGE.

Application filed March 25, 1921, Serial No. 455,680. Renewed January 7, 1927.

This invention relates to pressure gauges, and provides a gauge which is particularly adapted for use in connection with pneumatic tires.

In gauges of this type it is customary to provide an indicating member with means for holding such member in indicating position after the gauge is removed from the tire valve. Such gauges have hitherto been generally of two types, in one of which the pressure-responsive member, such as a piston or the like, has been held in its displaced position together with the indicating member, by a catch or similar device, all of the parts being held with the loading spring under the tension which has been given to the spring by the air pressure. Such gauges have the merit of a positive holding of the parts until released. In the second type of gauge the indicating member is disconnected from the piston or other pressure-responsive member, and is held in pressure-indicating position by friction or the like. The pressure-responsive member in this type returns to its initial position as soon as the pressure is relieved, and the indicating member, after the reading operation, is restored by pushing it back by hand to zero position. This avoids the holding of the spring under compression and the snapping back of the indicator bar, but has the disadvantage that sometimes the bar is inadvertently pushed in before the reading is taken, with the result that a false reading is obtained.

According to the present invention I provide a construction in which, to a large extent, the advantages of both methods are availed of, and the disadvantages obviated. In the preferred form of the present invention I provide an indicator which is detached or separated from the pressure-responsive member, and which is securely held in its indicating position until intentionally displaced.

In the drawing, wherein I have shown the preferred form of the invention,—

Figure 1 is a side elevation of the gauge;

Fig. 2 is an enlarged diametrical section;

Fig. 3 is a top view of the upper sleeve;

Fig. 4 is a section on the line 4—4 in Fig. 2;

Fig. 5 is a sectional view, partly in perspective, of the upper cap;

Fig. 6 is a detailed perspective view of the top spring holder.

Referring to the drawings, let A indicate the gauge as a whole, which is shown as formed with a cylindrical casing B having a foot portion C, the latter being displaced to a slightly angular position in order to bring the gauge casing out of line with the wheel, whereby to avoid interference by the latter with the movements of the gauge bar D or other indicating member. The foot C of the gauge is provided with the usual deflator E and packing ring F, the former being adapted to open the tire valve, and the latter adapted to make a tight joint between the gauge casing and the tire valve casing.

Within the casing B is some form of pressure-responsive member such as the piston G, shown as comprising the usual packing, and being adapted to move along the gauge casing in a lengthwise direction. The loading spring is indicated by the reference letter H, and is designed to resist the movement of the piston from its lowermost or zero position.

According to the present invention, the indicator D is disconnected or separate from the piston G, so that while it is moved toward the pressure-indicating position by the piston, the latter does not move it back to zero position after the pressure is removed and the piston returns. In the preferred construction illustrated, the indicator member is shown as a flat gauge bar which projects through the outer end of the casing, disclosing an appropriate scale which indicates the pressures. My invention provides means for securely holding the detached gauge bar in its pressure-indicating positions, and by "securely holding" is meant such holding as will avoid accidental displacement such as is liable in the case of an indicator which is held solely by friction. Preferably also, the invention includes means for positively holding the gauge bar against an inward movement until intentionally displaced. There is much less danger of an accidental outward movement of the gauge bar or other indicator, than of an inward movement. This is due to the fact that it requires a pulling movement to move it outwardly, while the mere accidental contact with the finger or any other object may be sufficient to move it inwardly.

The simplest form of the invention is that illustrated, wherein the gauge bar is provided with teeth or serrations I which are designed to engage a wall, such as J, on the gauge casing, or any other appropriate part of the gauge. In the construction shown the device is provided with a cap or sleeve K having an aperture L through it, through which the gauge bar passes. Means are provided for normally urging the gauge bar in a direction which will tend to engage the teeth I with the wall J, and in the construction shown this is accomplished by a spring M which has a circular portion lying within the cap, and an upwardly-extending arm N curved to fit the back of the gauge bar at O, so that the latter may move along the spring with a constant tendency to engage the wall J or its equivalent. The teeth are so pitched as to permit them to slide past the wall J during the outward movement of the gauge bar, and preferably are provided with lateral faces P which positively prevent the gauge bar from being retracted unless first disengaged from the wall J. This disengagement may be accomplished, in the construction shown, by merely pressing in the gauge bar laterally to disengage the teeth, and pushing it inwardly to restore the gauge bar to zero position.

In constructing the gauge it is best to provide a thimble Q at the top of the gauge, and a similar thimble R on the piston, such thimbles acting as guides or seats for the ends of the spring. The thimble Q may be advantageously of such a size as to fit the end of the gauge, and in assembling, the circular portion of the spring M may be placed on top of the thimble Q, the several parts being held in position by the cap K. The axial flange of the thimble Q also serves as a guide for the gauge bar. The thimble R provides a recess which is admirably adapted to receive the end of the gauge bar so as to maintain the same in substantially central or axial position within the casing.

In operation, as the piston moves upwardly, the gauge bar is also moved upwardly, the teeth riding along the wall J and maintaining contact therewith by the operation of the spring M. When the gauge is removed from the tire valve the gauge bar remains with one of its teeth engaging the wall J, while the piston returns to its lowermost position. When the teeth are constructed as shown, the gauge bar resists accidental displacement in either direction. In order for the gauge bar to move outwardly, the spring must be pressed backward. As a pulling force is required for such outward movement, it is very seldom that this force is sufficient to move back the spring unless it is intentionally applied. In the opposite direction the lateral portions of the teeth positively resist movement unless this movement is both inward and sidewise, which is very seldom the case in use. It is not essential that the teeth be provided with strictly lateral portions, since some slant may be given to the lower faces, but it is preferable that there should be a positive resistance to displacement in the direction of restoration to zero.

While I have shown and described one form of the invention, it will be understood that I do not wish to be limited thereto, since various changes may be made therein without departing from the spirit of the invention; and it is also apparent that the improvements are applicable to other types of gauges.

What I claim is:—

1. A pressure gauge for tire valves or the like, comprising a casing having an opening in its top, a piston in said casing, a loading spring for said piston, a detached gauge bar extending within the spring and through the opening in the end of said casing, said gauge bar having teeth formed therein, a cap carried by the casing, and a spring for urging the bar against said cap so that the teeth engage the cap, said spring comprising a section engaged by said cap to anchor the spring, and a section engaging the said bar.

2. A pressure gauge for tire valves or the like, comprising a casing, a pressure-responsive member therein, a slidable gauge bar detached from but adapted to be moved by said pressure-responsive member in one direction, the one having a socket or recess, and the other entering said recess and adapted to tilt therein.

3. A pressure gauge for tire valves or the like, comprising a casing, a pressure-responsive member therein, a slidable gauge bar detached from but adapted to be moved by said pressure-responsive member in one direction, said pressure-responsive member having means adapted to receive said gauge bar and permit it to be tilted with respect to the casing.

In witness whereof, I have hereunto signed my name.

HENRY P. KRAFT.